Figure 1:
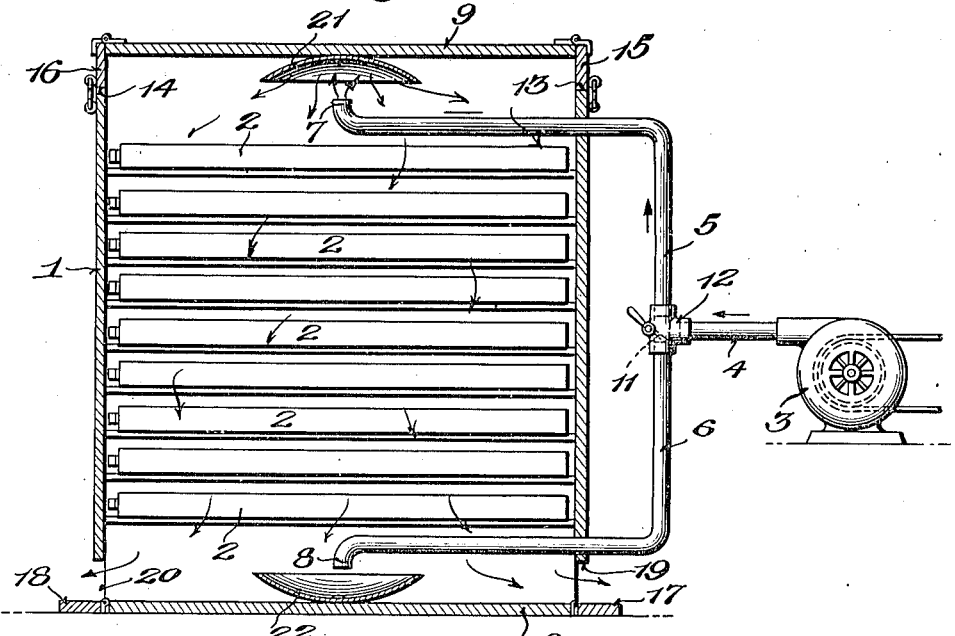

E. C. HORST.
DRIER.
APPLICATION FILED FEB. 6, 1918.

1,291,891.

Patented Jan. 21, 1919.

Witness
Chas. L. Griesbauer.

Inventor
Emil Clemens Horst
By Strong & Townsend
Attorneys.

UNITED STATES PATENT OFFICE.

EMIL CLEMENS HORST, OF SAN FRANCISCO, CALIFORNIA.

DRIER.

1,291,891.   Specification of Letters Patent.   Patented Jan. 21, 1919.

Application filed February 6, 1918. Serial No. 215,578.

*To all whom it may concern:*

Be it known that I, EMIL CLEMENS HORST, a citizen of the United States, residing at San Francisco, in the county of San Francisco and State of California, have invented certain new and useful Improvements in Driers, of which the following is a specification.

This invention relates to certain new and useful improvements in driers, and the primary object thereof is to provide a drier which has means for enabling control of the drying media so as to selectively effect flow thereof in various directions through the drier, and to also provide means for uniformly spreading the air throughout the area of the drier prior to the air encountering the trays or other supports for the material being dried.

Further, the invention aims to provide a cushioned body of air supply which is formed within the casing by deflecting the air in a direction opposite to that in which it enters the drier prior to the air being permitted to flow through the casing.

In the drawings:—

Figure 2:
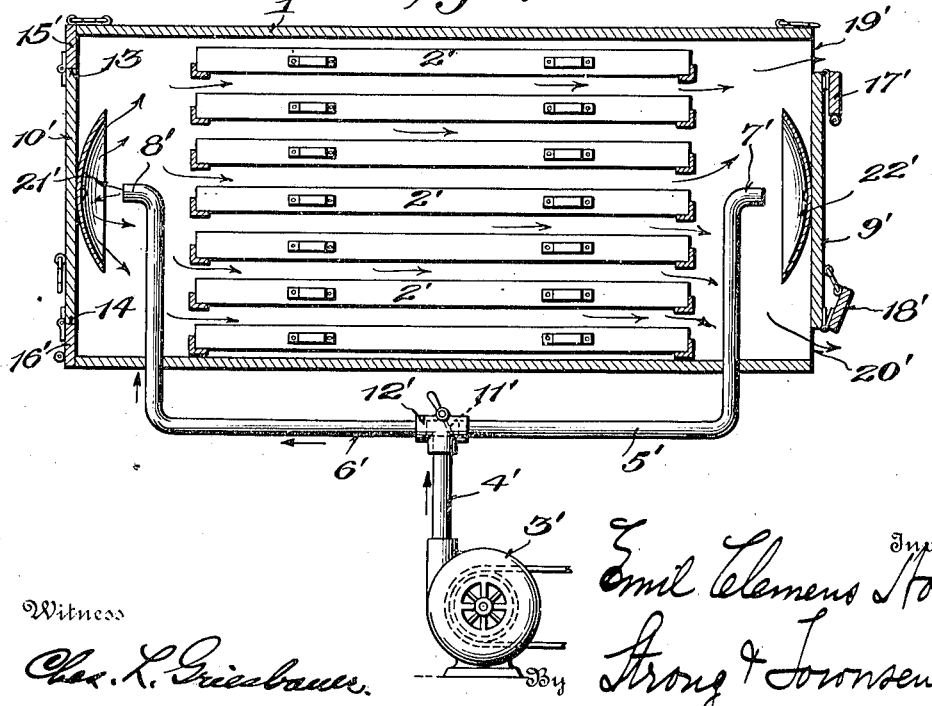

Figure 1 is a vertical sectional view of the invention showing a structure adapted for vertical flow of the air, and Fig. 2, is a similar view showing the structure to provide horizontal flow of the air.

In proceeding in accordance with the invention a casing or cabinet 1 is employed in which the usual trays 2 for the material to be dried are mounted. The supports for the material to be dried may be of any type within the art as at present practised, since such supports do not enter into the invention.

A suitably driven fan 3 has a pipe 4 leading therefrom and the latter has branches 5 and 6 the ends 7 and 8 of which discharge adjacent the opposed walls 9 and 10 of the cabinet. A swing or flap valve 11 is located within the T-fitting 12 and enables selective control of the air so as to cause the latter to flow through either one of the branches 5 and 6 to the exclusion of the other.

Air outlets 13 and 14 are formed in the ends of the cabinet at the top thereof and are controlled by suitable hinged flaps or valves 15 and 16, while similar hinged flaps or valves 17 and 18 control similar air outlets 19 and 20 formed in the cabinet ends at the bottom thereof.

The ends 7 and 8 of the air pipes 5 and 6 discharge the air against the concaves 21 and 22 located in confronting relation to said ends 7 and 8, space being provided between the concaves and the top and bottom walls 9 and 10 of the cabinet so as to form and confine a cushioned body of air prior to the latter rising and contacting with the material to be dried.

The action of the concaves or dished deflecting plates 21 and 22 is to spread the air and to deflect same in a direction opposite to that in which the air is introduced into the cabinet thus causing a cushioned body of air to be continuously maintained and from which the air is constantly forced and moved vertically to finally pass through either the upper or lower air outlets. It will be understood that when air is caused to enter the bottom of the casing the flaps 17 and 18 at said bottom are closed and the upper flaps 15 and 16 are opened to allow the air to egress through the upper outlets 13 and 14. Similarly when the air is caused to enter the top of the casing, the flaps 15 and 16 at said top are closed, while the flaps 17 and 18 at the bottom are opened to allow the air to egress through the outlets 19 and 20 as shown in Fig. 1. In this way the air can be controlled so as to first enter the bottom and egress through the top of the cabinet and then caused to enter the top and egress through the bottom effecting complete drying of the material by bringing the air first into contact with the bottom and then in contact with the top sides of the material.

In Fig. 2, the same principle is involved, the structure being the same as in Fig. 1, excepting that the air is forced horizontally or transversely through the casing instead of vertically. The parts in Fig. 2 are indicated by the same reference characters with the exception that the latter are primed, the differences being essentially that the concaves are vertically arranged instead of horizontally and the discharge ends 7 and 8 of the air feed pipes are similarly disposed.

Obviously, the horizontal and vertical air feeding can be embodied in a single structure.

What is claimed is:—

1. In a drier, a cabinet having an air inlet in each of two opposite walls and air outlets at opposite ends of each of said opposite walls thereof, a concave in the cabinet adjacent each of said opposite walls and having the concavity thereof confronting the respective walls in spaced relation thereto, a source of supply, means to conduct air from the source of supply and to discharge same to the concavities of the concave through said air inlets and means to selectively control the air to cause same to discharge through either inlet to the exclusion of the other.

2. In a drier, a cabinet having a pair of air outlets at the ends respectively of each of two opposed walls, means to control each of said outlets, an inwardly facing concave fixed to each of the walls at points substantially central between the air outlets thereof, means to selectively supply air to either of the concaves, and means to maintain the controlling means of either of the walls closed when air is being supplied to the concave of that wall.

3. In a drier, a cabinet having a pair of air outlets at the ends respectively of each of two opposed walls, means to control each of said outlets, air spreading means fixed to each of the walls between the air outlets thereof, means to selectively supply air to either of the concaves, and means to maintain the controlling means of either of the walls closed when air is being supplied to the air spreading means of that wall.

4. In a drier, a cabinet, concaves fixed to respective opposite walls of the cabinet, air outlets on opposite sides of each of said concaves, controlling means for each air outlet, means to supply air under pressure to each concave, and means to maintain the controlling means of one of the said walls closed when the controlling means of the other of said walls are open.

5. In a drier, a cabinet having substantially flat opposite walls, a concave affixed to each of said walls so as to project therebeyond and inwardly into the cabinet, an air outlet for each of said walls, means to control the air outlets, and means to supply air under pressure to the concaves.

6. In a drier, a cabinet having opposed walls, air spreading means affixed to each wall and projecting beyond the wall and into the cabinet so as to enable the walls to confine the air to form an air cushion, means to supply air to the air spreading means, and controlled outlets for the air adjacent each of said walls.

7. In a drier, a cabinet, air spreading means affixed to one of the walls of the cabinet so as to project therebeyond and into the cabinet so as to enable said wall to confine the air to form an air cushion, means to supply air to the air spreading means, and a controlled outlet.

In testimony whereof I affix my signature in the presence of two witnesses.

EMIL CLEMENS HORST.

Witnesses:
ROYCE A. RUESS,
HAMSON M. BROOKS.